Sept. 19, 1939.   A. F. FROUSSARD   2,173,360
SHAFT COUPLING
Filed Aug. 1, 1938
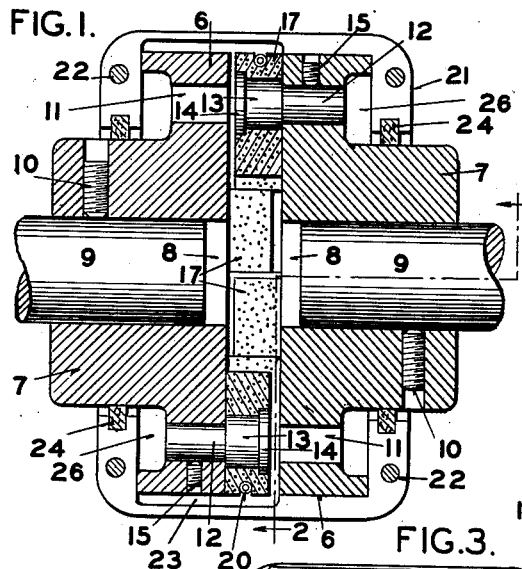
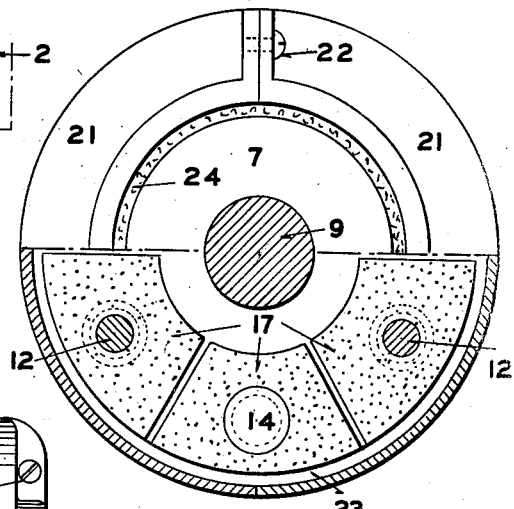
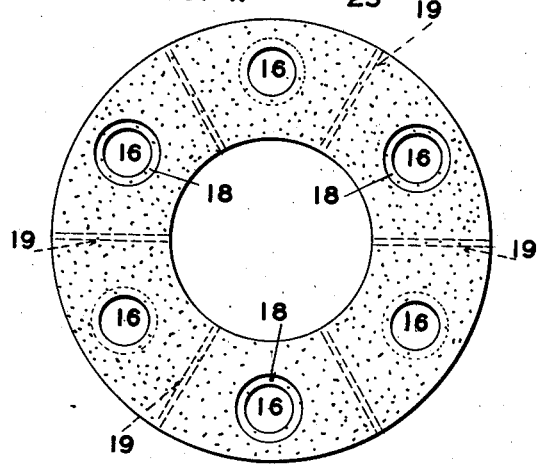
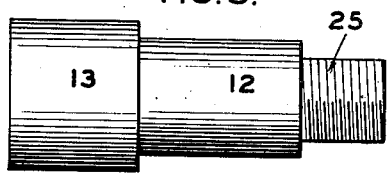
INVENTOR.
A. F. FROUSSARD
BY
/ATTORNEY.

Patented Sept. 19, 1939

2,173,360

UNITED STATES PATENT OFFICE 2,173,360

SHAFT COUPLING

Albert F. Froussard, St. Louis, Mo.

Application August 1, 1938, Serial No. 222,402

3 Claims. (Cl. 64—9)

My invention relates to a shaft coupling and more particularly to a coupling of the flexible type which will permit the driving of one section of shafting from another without binding of the shaft in its bearings or hangers when the sections are slightly out of alignment with each other either in concentric or angular relation. Such couplings are commonly of the pin and disk construction in which the necessary relative movement between the parts is secured either by play between the pins and oversize openings in one of the parts with which they engage or by the compression or stretching of a resilient or flexible member or members located between the disks and transmitting power from one to the other through the medium of the pins.

It is the object of the present invention to provide a flexible shaft coupling of the pin and disk type in which there will be no appreciable play between the pins and the parts with which they engage and in which the necessary relative movement is secured by play between the connecting members secured to the disks by the pins, said connecting members being of non-metallic but rigid material. By this construction I insure long life of the coupling due to the elimination of wear between the pins and enlarged openings and also by avoiding the use of material liable to deteriorate, such as rubber or rubber and fabric combinations. At the same time I secure effective and substantially noiseless operation of the coupling.

In the accompanying drawing which illustrates a shaft coupling made in accordance with my invention, Figure 1 is a central longitudinal section; Figure 2 is an end view, partly in elevation and partly in section on the line 2—2 of Figure 1; Figure 3 is a side view, the housing being partly broken away; Figure 4 is a side view of the connecting members partially formed; and Figure 5 is an enlarged view of one of the pins showing a modification.

The coupling comprises a pair of disks 6 each carried by a hub 7 having a central opening 8 for the reception of the end of a section of shaft 9. The shaft may be secured in the hubs by any suitable means, such as setscrews 10. Formed in each of the disks are a series of equidistantly spaced holes 11. In the specific form of coupling shown in the drawings there are six of these holes in each disk but the number may be varied. While each disk is provided with six holes, only three are utilized to hold pins and the intermediate holes may be omitted. Each pin comprises a body 12 and an enlarged head 13 provided with a retaining flange 14. The body 12 fits snugly into one of the holes 11 and is held in position by a set screw 15. The head 13 fits snugly into an opening 16 in one of the connecting members 17 and the flange seats in a counterbore 18 around the opening. The connecting members are made of fibre or other non-metallic but rigid material and each is in the form of a sector of an annulus. Their opposing radial edges are spaced apart, as shown in Figure 2, to provide for the relative movement of the disks. One method of securing this result is shown in Figure 4. In using this method, an annulus is formed, the outer diameter of which is equal to the outer diameter of the disks. This annulus is then divided into sectors by saw cuts 19, the width of which is such as to provide the proper clearance between the members. The openings 16 and counterbores 18 may be formed before or after the sawing operating.

Each alternate connecting member is secured to one of the disks and the intermediate members to the other. The disks are secured on the shafts with their faces separated by a distance appreciably greater than the thickness of the connecting members, as shown in Figure 1, to permit angular displacement between the sections of shaft. To facilitate the assembly of the annulus of connecting members, it may have a groove formed in its periphery to receive an elastic band 20 to hold it in position during assembly. This band may be a coil spring or a strip of rubber or the like.

To protect the coupling against the entrance of grit or the like, a housing may be provided. This housing is composed of two semi-cylindrical parts 21 secured together by screws or bolts 22. One end of the housing fits tightly around one of the disks and the other is provided with an enlarged bore 23 to permit lateral movement between the disks. The ends of the housing extend inwardly nearly to the hubs 7 and are provided with grooves to receive felt packing washers 24 to form dust-tight joints with said hubs.

In Figure 5 I have shown a modified form of pin in which the body 12 is provided with a threaded stud 25 which may be employed to secure the pin in position in lieu of the setscrew 15. The disks are provided in their outer faces with annular recesses 26 (Figure 1) for the reception of the nuts (not shown) when pins of this form are used. This figure also shows the omission of the retaining flange 14. In case the flange is omitted, the holes 11, which are not engaged by the pins, may be enlarged to permit the passage of the heads 13 in the manner shown and described in my copending application Serial No. 111,787, filed November 20, 1936.

Having fully described my invention, what I claim as new and desire to secure by Letters Patent of the United States is:

1. In a shaft coupling of the pin and disk type, a pair of disks secured to shaft sections with their opposing faces spaced apart, and a plurality of connecting members secured alternately to said disks by pins, said pins fitting snugly in openings in both disks and connecting members, said connecting members being spaced apart to provide clearance to permit lateral movement between the disks.

2. In a shaft coupling of the pin and disk type, a pair of disks secured to shaft sections with their opposing faces spaced apart, and a plurality of connecting members secured alternately to said disks, each of said connecting members being in the form of a sector of an annulus, said members having their radial edges spaced apart to provide clearance to permit lateral movement between the disks.

3. In a shaft coupling of the pin and disk type, a pair of disks secured to shaft sections with their opposing faces spaced apart, and a plurality of connecting members secured alternately to said disks by pins, said pins fitting snugly in openings in both disks and connecting members, each of said connecting members being in the form of a sector of an annulus, said members having their radial edges spaced apart to provide clearance to permit lateral movement between the disks.

ALBERT F. FROUSSARD.